United States Patent
Obaidat et al.

(10) Patent No.: US 11,183,343 B1
(45) Date of Patent: Nov. 23, 2021

(54) COMPOSITE MATERIAL FOR SUPERCAPACITOR ELECTRODES

(71) Applicant: UNITED ARAB EMIRATES UNIVERSITY, Al Ain (AE)

(72) Inventors: Ihab M. Obaidat, Al Ain (AE); Hee-Je Kim, Busan (KR); Chandu V. V. Muralee Gopi, Busan (KR); Sambasivam Sangaraju, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 17 days.

(21) Appl. No.: 16/994,589

(22) Filed: Aug. 15, 2020

(51) Int. Cl.
| | |
|---|---|
| *H01G 11/46* | (2013.01) |
| *H01G 11/86* | (2013.01) |
| *H01G 11/04* | (2013.01) |
| *H01G 11/36* | (2013.01) |
| *B82Y 30/00* | (2011.01) |
| *C01G 51/04* | (2006.01) |
| *C01G 53/04* | (2006.01) |
| *H01G 11/26* | (2013.01) |
| *B82Y 40/00* | (2011.01) |

(52) U.S. Cl.
CPC ............. *H01G 11/46* (2013.01); *C01G 51/04* (2013.01); *C01G 53/04* (2013.01); *H01G 11/04* (2013.01); *H01G 11/26* (2013.01); *H01G 11/36* (2013.01); *H01G 11/86* (2013.01); *B82Y 30/00* (2013.01); *B82Y 40/00* (2013.01); *C01P 2004/82* (2013.01)

(58) Field of Classification Search
CPC ......... H01G 11/46; H01G 11/36; H01G 51/04
USPC ........................................... 252/518.1, 521.2
See application file for complete search history.

(56) References Cited

U.S. PATENT DOCUMENTS 9,916,914 B2    3/2018    Li et al.

FOREIGN PATENT DOCUMENTS

| CN | 104282446 A | | 1/2015 | |
|---|---|---|---|---|
| CN | 104821238 A | | 8/2015 | |
| CN | 107591251 A | | 1/2016 | |
| CN | 106340396 A | | 1/2017 | |
| CN | 109273283 A | * | 1/2019 | ............. H01G 11/30 |
| CN | 109742333 A | | 5/2019 | |
| CN | 110136975 A | | 8/2019 | |

OTHER PUBLICATIONS

Yin et al ("Hierarchical nanosheet-based $CoMoO_4$—$NiMoO_4$ nanotubes for applications in asymmetric supercapacitors and the oxygen evolution reaction", Journal of Materials Chemistry A, 2015, 3, pp. 22750-22758). (Year: 2015).*

(Continued)

*Primary Examiner* — Tri V Nguyen
(74) *Attorney, Agent, or Firm* — Nath, Goldberg & Meyer; Richard C. Litman

(57) ABSTRACT

A composite material comprising $NiMoO_4$—$CoMoO_4$ nanosheets can be an electrode in a hybrid supercapacitor. A hybrid supercapacitor having a cathode comprising the composite material exhibits a large operating window, high energy density and high cycling stability. The heterostructure material may be formed by a one-step chemical bath deposition process.

3 Claims, 13 Drawing Sheets

(56) References Cited

OTHER PUBLICATIONS

Lin "Material Effects on the Electrocapacitive Performance for the Energy-storage Electrode with Nickel Cobalt Oxide Core/shell Nanostructures." Electrochimica Acta 250 (2017) 335-347 (Year: 2017).*

Zhang New NiMoO4/CoMoO4 composite electrodes for enhanced performance supercapacitors. Ionics (2020) 26:3579-3590 (Year: 2020).*

* cited by examiner

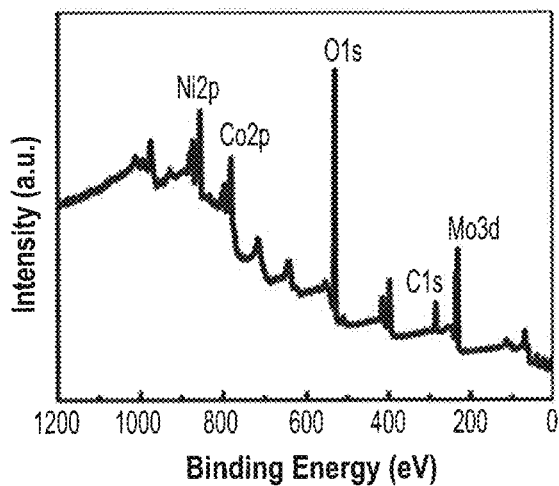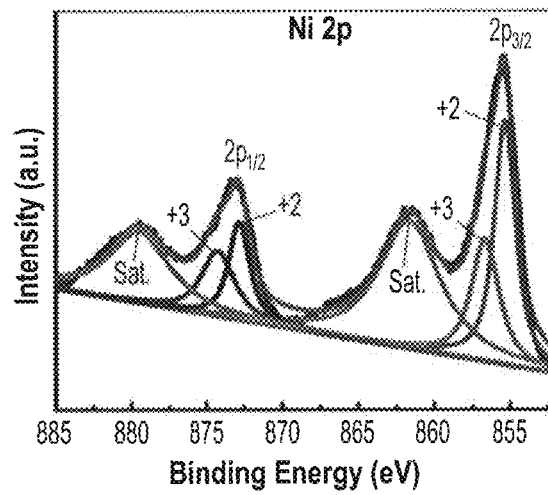
FIG. 4A
FIG. 4B
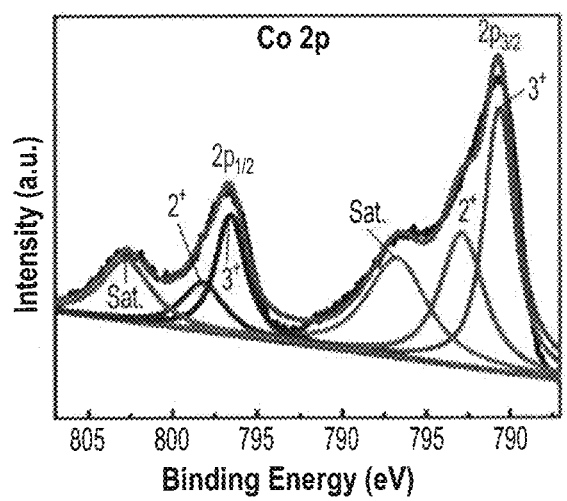
FIG. 4C

COMPOSITE MATERIAL FOR SUPERCAPACITOR ELECTRODES

BACKGROUND

1. Field

The disclosure of the present patent application relates generally to supercapacitors. More specifically, the disclosure relates to a composite material useful as an electrode in a high energy density hybrid supercapacitor (HSC), a method of synthesizing the composite material and an HSC comprising the composite material.

2. Description of the Related Art

Supercapacitors (SC) have advantageous features for energy storage, including rapid charge-discharge rates, high power density and outstanding cycling performance. Improving energy density, power density and cycling performance could make SCs suitable for next-generation high-performance energy storage devices. However, SCs deliver lower energy density than rechargeable batteries, limiting their commercialization. Asymmetric/hybrid SCs (ASCs/HSCs) may achieve improved energy density. Hybrid SCs combine pseudocapacitor/battery-type and electric double layer capacitor (EDLC) materials.

Generally, the performance of supercapacitors relies on a choice of electroactive material. Based on the electroactive material type and charge storage mechanism, supercapacitors are classified into two categories: electrochemical double layer capacitors (EDLCs) and pseudocapacitors. EDLCs include carbon-based electrodes made of high specific surface area per volume materials, such as activated carbon, carbon nanotubes, graphene, for which charge is stored on the basis of electrostatic interaction. Pseudocapacitors include materials such as metal oxides, hydroxides, and sulfides, for which charge is stored via reversible faradic reactions. Pseudocapacitor materials deliver higher energy storage density, while EDLC materials offer higher stability and potential window during electrochemical measurements. However, in addition to being cost-effective, battery-type materials (e.g., $Co_3O_4$, $NiCo_2O_4$, $Ni_3S_2$, etc.) provide higher energy storage performance than that do pseudocapacitor materials ($MnO_2$, $RuO_2$, etc.) owing to their high electrochemical conductivity, rapid redox activity, and high theoretical capacity.

A supercapacitor solving the aforementioned problems is desired.

SUMMARY

A $NiMoO_4$—$CoMoO_4$ composite material comprises flower-like $NiMoO_4$—$CoMoO_4$ nanosheet arrays (NSAs). The $NiMoO_4$—$CoMoO_4$ composite material is useful as a battery-type material for a supercapacitor cathode.

The hierarchical flower-like $NiMoO_4$—$CoMoO_4$ NSAs may be synthesized using a facile one-step chemical bath deposition (CBD) method. This method is simple, cost-effective, and applicable for large area deposition.

A hybrid supercapacitor (HSC) may be fabricated using the $NiMoO_4$—$CoMoO_4$ composite material as an electrode. In an embodiment, the HSC features a cathode comprising $NiMoO_4$—$CoMoO_4$ NSAs and may further comprise an anode comprising a conductive ink, such as graphene ink.

These and other features of the present teachings will become readily apparent upon further review of the following specification.

BRIEF DESCRIPTION OF THE DRAWINGS

FIGS. 4A-4E depict (A) the XPS total spectrum of the as-synthesized $NiMoO_4$—$CoMoO_4$ composite material and (B-E) deconvoluted XPS spectra of the Ni 2p, Co 2p, Mo 3d and O is elements, respectively.

Similar reference characters denote corresponding features consistently throughout the attached drawings.

DETAILED DESCRIPTION OF THE PREFERRED EMBODIMENTS

Figure 1:
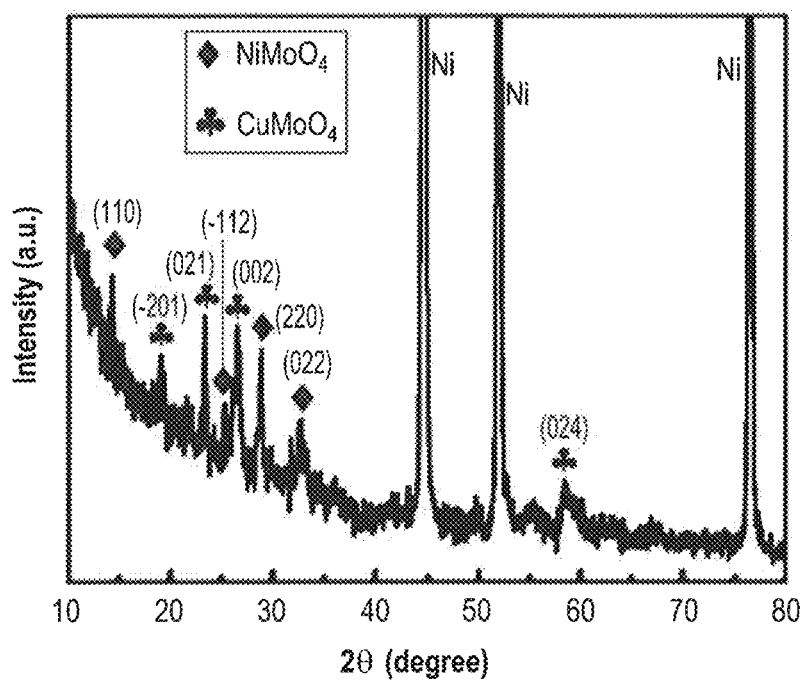
FIG. 1 depicts the X-ray diffraction (XRD) pattern of exemplary fabricated flower-like $NiMoO_4$—$CoMoO_4$ NSAs on the surface of Ni foam.

An $NiMoO_4$—$CoMoO_4$ composite material according to the present subject matter comprises flower-like $NiMoO_4$—$CoMoO_4$ nanosheet arrays (NSAs). The $NiMoO_4$—$CoMoO_4$ composite material may be synthesized via a facile one-step chemical bath deposition (CBD) method followed by a heat treatment. The $NiMoO_4$—$CoMoO_4$ composite material is useful as a battery-type material for a supercapacitor cathode. Exemplary $NiMoO_4$—$CoMoO_4$ composite material formed on Ni foam material were synthesized, as discussed in the following examples, and incorporated as a cathode into a proof-of concept HSC. The as-synthesized cathode (hierarchical flower-like $NiMoO_4$—$CoMoO_4$ composite material grown on Ni) has several advantageous properties, including, synergetic effects of $CoMoO_4$ and $NiMoO_4$ in the $NiMoO_4$—$CoMoO_4$ NSAs; abundant electroactive sites for rapid redox reactions; and a large accessible surface area for electrolyte penetration, which is beneficial for the rapid diffusion of electrolyte ions and enhances energy storage capabilities.

Ternary metal oxide materials (such as $NiCo_2O_4$, $CuCo_2O_4$, $NiMoO_4$, and $CoMoO_4$) may provide higher energy storage performance than single component metal oxides. These ternary metal oxides possess multiple oxidation states, which enable multiple redox reactions during electrochemical reactions. Metal molybdates, such as $NiMoO_4$ and $CoMoO_4$, are abundant, low-cost and reliable in redox transformations of Ni and Co. Generally, $CoMoO_4$ material provides good rate capability and low capacitance, while $NiMoO_4$ offers high capacitance and low rate capability. The as-synthesized $NiMoO_4$—$CoMoO_4$ composite material was shown to exhibit specific capacities of 236.86 and 218.97 mA hg$^{-1}$ at 2 and 10 A g$^{-1}$, respectively; and cycling stability of 97.19% over 5000 cycles.

The hierarchical flower-like $NiMoO_4$—$CoMoO_4$ NSAs may be synthesized using a facile one-step chemical bath deposition (CBD) method. This method is simple, cost-effective, and applicable for large area deposition. An Ni foam supported $NiMoO_4$—$CoMoO_4$ composite can be prepared by mixing 0.05 M of $Ni(NO_3)_2.6H_2O$, 0.05 M of $Co(NO_3)_2.6H_2O$, 0.1 M of $Na_2MoO_4.2H_2O$, 0.12 M of $NH_4F$ and 0.24 M of $Cl_4N_2O$ in 70 mL DI water to form a growth solution, immersing Ni foam in the growth solution, and heating the Ni foam in the growth solution. The $NiMoO_4$—$CoMoO_4$ material-loaded Ni foam can then be removed from the solution, dried, and annealed for further use. The hierarchical flower-like NiMoO4-CoMoO4 NSAs enable a large accessible surface area for electrolyte penetration, which is beneficial for rapid diffusion of electrolyte ions and enhances the energy storage capabilities of the nanosheets.

A hybrid supercapacitor (HSC) may be fabricated using the $NiMoO_4$—$CoMoO_4$ composite material as an electrode. In an embodiment, the HSC features a cathode comprising $NiMoO_4$—$CoMoO_4$ NSAs and an anode comprising a conductive ink, such as graphene ink. In an embodiment, the cathode includes $NiMoO_4$—$CoMoO_4$ NSAs on the surface of nickel (Ni). A piece of cellulose paper can be used as a separator between the cathode and the electrode with an aqueous electrolyte, e.g., 1 M KOH. An exemplary HSC was fabricated and demonstrated a large operating potential window of 1.5 V; an energy density of
27.58 W h kg$^{-1}$ at 636.05 W kg$^{-1}$; and a cycling stability of 95.88% retention with 96.3% of columbic efficiency over 5000 cycles.

These and other features of the present teachings will become readily apparent upon further review of the following specification.

"Nanoscale" and "microscale" refers to dimensions in the ranges of 1-999 nm and 1-999 µm, respectively. As discussed herein, nano or micro-structures may include low dimensional sub-units, including, for example, zero dimensional (0D) nanoparticles; one dimensional (1D) nanowires or nanotubes or, when grown to protrude from a substrate, nanoneedles, and two dimensional (2D) nanosheets or nanoflakes, in which these sub-units may be aligned or oriented in a well ordered fashion.

Nanostructures refer to materials having a dimension of a scale ranging from 1 to 1000 nm. For example, a nanosheet is a nanostructure with at least one nanoscale dimension (thickness), i.e., a thickness in a scale ranging from 1 to 1000 nm. A nanowire is a nanostructure with two of three dimensions being nanoscale.

The term "flower-like" structures refers to structures of overlapping nanosheet structures in an aggregate on the microscale or smaller. Overlapping occurs at least in part for projections of the nanosheet structures in a direction of the thinnest dimension of the nanosheet structures, and gaps or spaces typically exist between the nanosheet structures in the aggregate. In this way, the nanosheet structures are like petals in a flower. The flower-like structures encompass a larger surface area than a projection of the aggregate onto any two-dimensional plane.

It should be understood that the amounts of materials for the methods described herein are exemplary, and appropriate scaling of the amounts are encompassed by the present subject matter, as long as the relative ratios of materials are maintained. As used herein, the term "about," when used to modify a numerical value, means within ten percent of that numerical value.

The present teachings are illustrated by the following examples.

EXAMPLES

Example 1

Exemplar Synthesis of $NiMoO_4$—$CoMoO_4$ Composite Material

Nickel foam is an ideal supporting substrate for active materials in supercapacitors due to its high porosity, large surface area, good electric conductivity, and excellent chemical stability in a wide variety of liquid electrolytes. Nickel foam was used for deposition of materials in the present example, but it should be understood that another substrate material may be used, particularly another conductive foam or mesh with sufficient stability in the liquid electrolyte used in the final HSC.

Prior to the deposition, for each prepared cathode, a Ni foam (1×1.5 cm$^2$) was cleaned with 1 M HCl to remove the surface oxide layer. Then, the foams were thoroughly washed with ethanol and de-ionized (DI) water several times. A back side of the Ni foam area (1×1.5 cm$^2$) was attached with a glass slide to restrict the deposition of active material. A portion of a front side of the Ni foam portion (1×0.5 cm$^2$) was covered with a Kapton tape to provide an electrical contact, leaving the remaining 1×1 cm$^2$ for the growth of the electroactive material. To prepare the Ni foam supported $NiMoO_4$—$CoMoO_4$ composite, a growth solution was prepared by mixing 0.05 M of $Ni(NO_3)_2.6H_2O$, 0.05 M of $Co(NO_3)_2.6H_2O$, 0.1 M of $Na_2MoO_4.2H_2O$, 0.12 M of $NH_4F$ and 0.24 M of $CH_4N_2O$ in 70 mL DI water. The growth solution was then stirred for 30 min. The well-cleaned Ni foam prepared as above was placed in a 100 mL glass bottle with the growth solution. The glass bottle was placed in a hot air oven at 100° C. for 6 h. The Ni foams were placed vertically inside the glass bottle. After the reaction time ended, the $NiMoO_4$—$CoMoO_4$ material loaded Ni foam was cleaned with DI water, and dried at 60° C. for overnight. Finally, the as-prepared $NiMoO_4$—$CoMoO_4$ electrode was annealed at 200° C. for 2 h for further use.

Generally, the CBD method was conducted at a temperature ranging from 50° C. to 130° C. and the reaction time ranged from 2 to hours 10 hours. The electrochemical performance (specific capacitance) of the resulting supercapacitor cathode material depended to some degree on the temperature and time chosen. At different temperatures (e.g., 60° C., 80° C., 100° C., 120° C., and 130° C.) and different times (e.g., 2 hours, 4 hours, 6 hours, 8 hours, and 10 hours), the electrode material exhibited varied performance. At lower temperatures (60° and 80° C.) and shorter deposition times (2 hours and 4 hours), a small amount of active material was loaded on the Ni foam substrate, which resulted in lower specific capacitance. At higher temperatures (120° C. and 130° C.) and longer deposition times (8 hours and 10 hours), a large amount of active material was loaded on the Ni foam substrate, causing peeling of the active material during the electrochemical test, which also resulted in low specific capacitance. At temperatures ranging between 80° C. and 120° C., and particularly 100° C. and times ranging from 4 hours to 8 hours, and particularly 6 hours, as discussed above, sufficient material deposition occurred without resulting in excess peeling. Thus, according to some embodiments, the CBD method can be performed at a temperature of 100° C. for a time of 6 hours.

The annealing step activates the material and converts the metal hydroxides into metal oxides. Annealing temperature and time do not significantly alter the electrochemical performance of the supercapacitor. Generally, the annealing temperature may range from 200° C. to 300° C. and the time may range from 1 hour to 3 hours. In the present example, the temperature was chosen to be 200° C. and time 2 hours, without particular limitation.

$NiMoO_4$ or $CoMoO_4$ materials on Ni foam were also prepared by a similar process to that described above except there was no addition of $Co(NO_3)_2.6H_2O$ or $Ni(NO_3)_2.4H_2O$. The active material weights of the $NiMoO_4$, $CoMoO_4$, and $NiMoO_4$—$CoMoO_4$ electrodes on Ni foam were found to be 2.6, 2.5, and 3.2 mg cm$^{-2}$, respectively.

Example 2

Morphological and Electrochemical Properties of Exemplary as-Synthesized Materials The morphology, crystalline structure, phase purity, elemental valance states and chemical composition of the as-developed electrodes were characterized using scanning electron microscopy (FE-SEM, S-4800, Hitachi), transmission electron microscopy (TEM), high-resolution TEM (HR-TEM), X-ray diffraction (XRD, D8 ADVANCE) equipped with Cu Kα radiation, and X-ray photoelectron spectrometry (XPS, VG scientific ESCALAB 250), respectively. The SEM, TEM, XRD XPS, and other measurements were conducted using active material loaded on Ni-foam substrates, prepared as above.

Electrochemical measurements, such as cyclic voltammetry (CV), galvanostatic charge-discharge (GCD), and electrochemical impedance spectroscopy (EIS) of the $NiMoO_4$—$CoMoO_4$ NSAs composite material were determined using a Bio-Logic SP-150 electrochemical workstation with a three-electrode cell system in 3 M KOH aqueous solution. The as-prepared $NiMoO_4$—$CoMoO_4$ composite material, a platinum wire, and a Ag/AgCl electrode were used as working, counter, and reference electrodes, respectively.

For the three electrode system, the specific capacity ($Q_{SC}$, mA h g$^{-1}$) of the cathode material and the specific capacitance ($C_{SC}$, F g$^{-1}$) of the anode material were calculated by the following equations:

$$Q_{SC} = \frac{I \times \Delta t}{m \times 3.6} \quad (1)$$

$$C_{SC} = \frac{I \times \Delta t}{m \times \Delta V} \quad (2)$$

where I, Δt, m and ΔV are the discharge current (A), the discharge time (s), the mass (g) and the operating potential window (V), respectively.

Exemplary hierarchical flower-like $NiMoO_4$—$CoMoO_4$ NSAs were grown on a Ni foam surface using the chemical bath deposition method as described above. The crystal structure and phase of the obtained product scratched from the Ni foam substrate were examined by XRD, and the corresponding pattern is depicted in FIG. 1. The sharp and strong diffraction peaks of Ni are due to the background of Ni foam. The diffraction peaks observed at 14.27°, 25.33°, 28.85° and 32.68° are attributable to the (110), (−112), (220), and (022) planes of the cubic phase of $NiMoO_4$ (PDF, card no. 33-0948). The other diffraction peaks obtained at 19.03°, 23.36°, 26.51° and 58.47° may be indexed to (−201), (021), (002) and (024) planes of the monoclinic $CoMoO_4$ (PDF, card no. 21-0868). Hence, the XRD pattern of $NiMoO_4$—$CoMoO_4$ composite contains the diffraction peaks of both $NiMoO_4$ and $CoMoO_4$, demonstrating the presence of both phases, and absence of other contaminants.

Figure 2A:
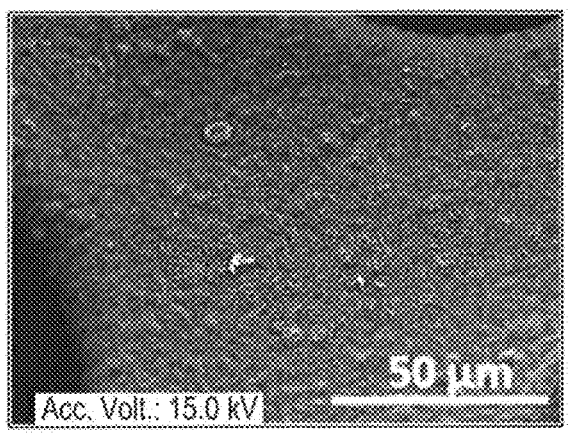
FIGS. 2A-2I depict low- and high-magnification scanning electron microscopy (SEM) images of as-synthesized (A,B) $CoMoO_4$, (C, D) $NiMoO_4$ and (E, F) $NiMoO_4$—$CoMoO_4$ composite materials formed on the surface of Ni foam; (G, H) transmission electron microscopy (TEM) and (I) high resolution TEM (HR-TEM) images of the as-synthesized $NiMoO_4$—$CoMoO_4$ composite material.
Figure 2B:
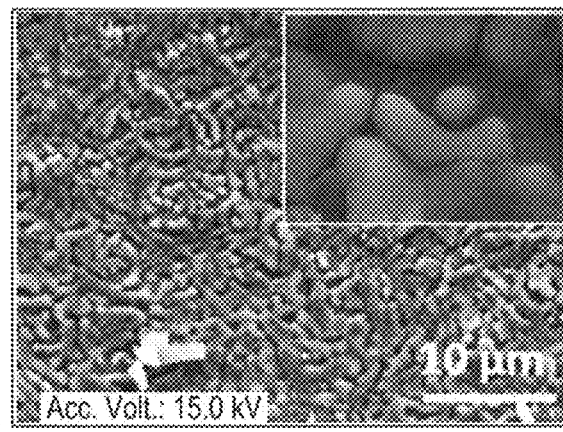
Figure 2C:
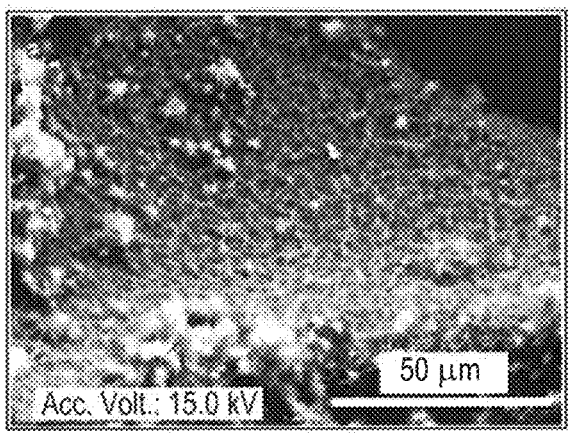
Figure 2D:
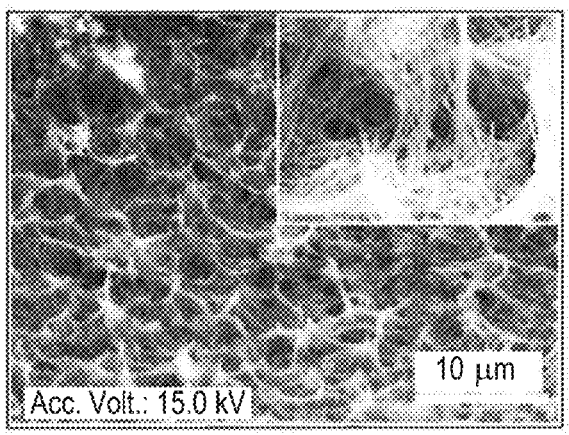
Figure 2E:
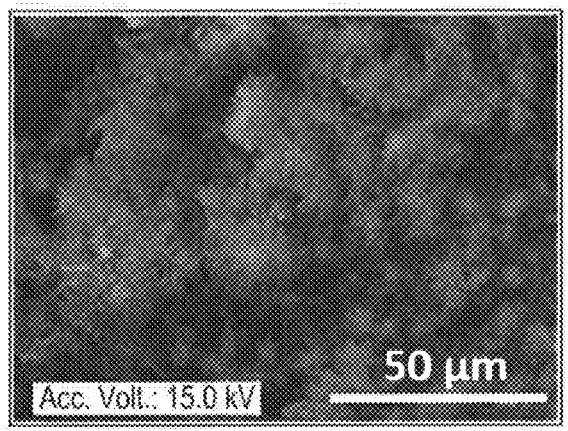
Figure 2F:
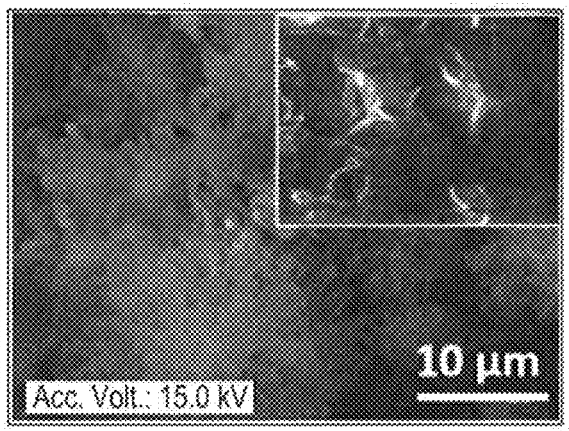

The surface morphology of the as-prepared $NiMoO_4$—$CoMoO_4$ composite material was examined using SEM characterization, and the corresponding SEM images are shown in FIGS. 2A-2F. FIG. 2A shows a low-magnification SEM image of the $CoMoO_4$, which suggests the existence of a thin layer of $CoMoO_4$ on the Ni foam surface. The corresponding high magnification images (FIG. 2B) show that nanoscale to microscale pellet-like structures are grown on the surface of Ni foam. No sheet-like structures were formed by the $CoMoO_4$ alone. As can be seen from FIGS. 2C, 2D, $NiMoO_4$ nanowires were directly grown on the Ni foam surface as an orderly arranged nanowire array. Again, no sheet-like structures were formed by the $NiMoO_4$ alone. In contrast, FIG. 2E depicts a low-magnified SEM image of the $NiMoO_4$—$CoMoO_4$ composite formed as described above. FIG. 2E demonstrates that flower-like nanostructures are grown on the surface of Ni foam when using the present CBD) method to deposit a $NiMoO_4$—$CoMoO_4$ composite material. A corresponding high-magnification SEM image in FIG. 2F reveals that the flower-like nanostructures consist of interconnected nanosheet arrays. Such hierarchical flower-like nanosheet array structures enable a large accessible surface area for electrolyte penetration, which is beneficial for rapid diffusion of electrolyte ions and enhances the energy storage capabilities of the nanosheets.

The typical sizes of the flower-like structures were in the range of about 4.3 μm to about 16 μm for the largest dimensions. Furthermore, irregularly sized gaps between the flower-like structures were observed. The thickness of the nanosheets making up the flower-like structures were in the range of about 18 nm to about 26 nm. Irregular distance between the nanosheets were observed within the flower like structures.

Figure 2G:
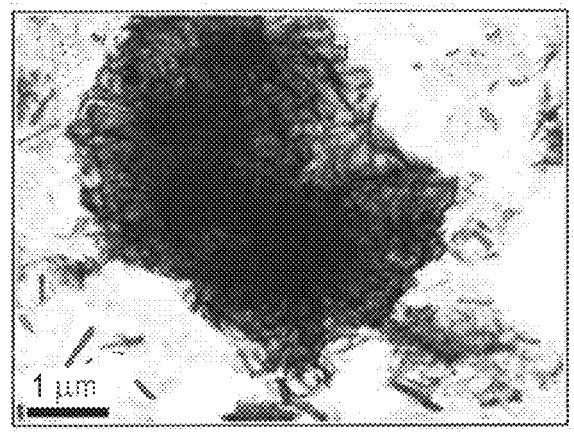
Figure 2H:
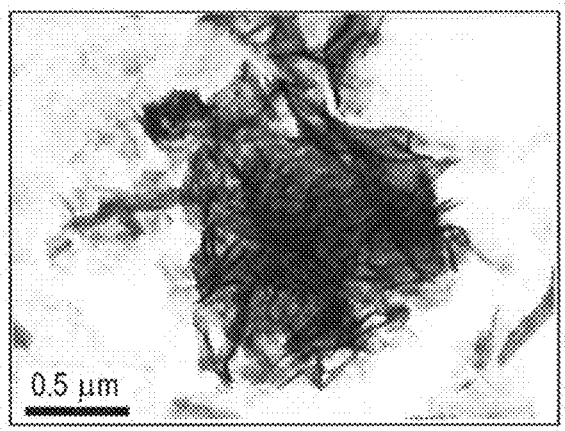
Figure 2I:
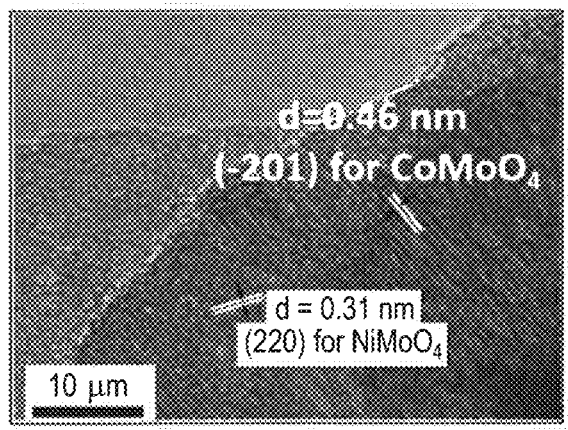
Figures 3A, 3B, 3C:
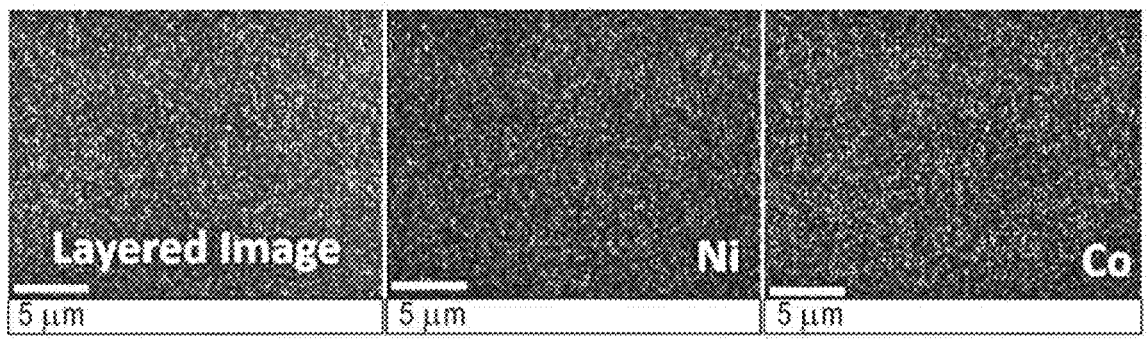
FIGS. 3A-3E depict energy dispersive X-ray spectroscopy (EDS) mapping of the as-synthesized $NiMoO_4$—$CoMoO_4$ composite material.
Figures 3D, 3E:
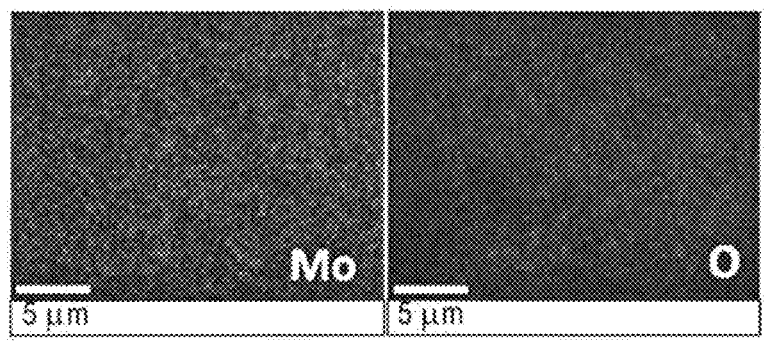

The morphology and crystalline properties of the $NiMoO_4$—$CoMoO_4$ NSAs were examined using TEM and HR-TEM characterization techniques. The TEM images in FIGS. 2G, 2H confirm that the as-prepared $NiMoO_4$—$CoMoO_4$ NSAs nanostructures consist of an assembly of interconnected nanosheets to form the flower-like shape. FIG. 2I depicts the HR-TEM image of the $NiMoO_4$—

CoMoO$_4$ NSAs electrode, which displays the interplanar spacing of 0.46 nm and 0.31 nm, corresponding to the (−201) plane of CoMoO$_4$ and the (220) plane of NiMoO$_4$, respectively. In addition, the energy dispersive X-ray spectrometry (EDS) mapping images FIGS. 3A-3E clearly reveal the homogeneous distribution of all the detected elements (Ni, Co, Mo and O) in the as-prepared NiMoO$_4$—CoMoO$_4$ NSAs.

Figure 4D:
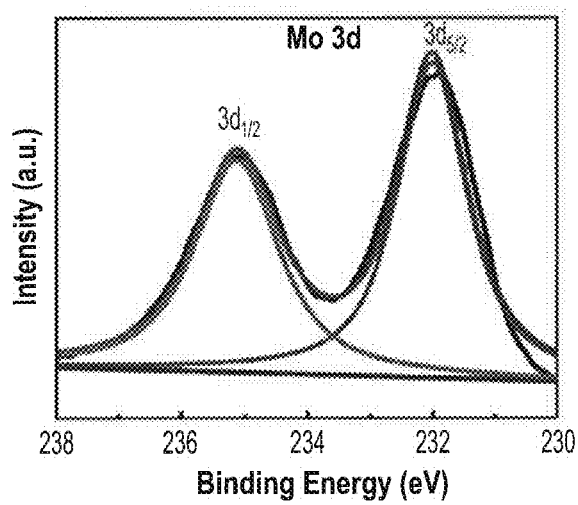
Figure 4E:
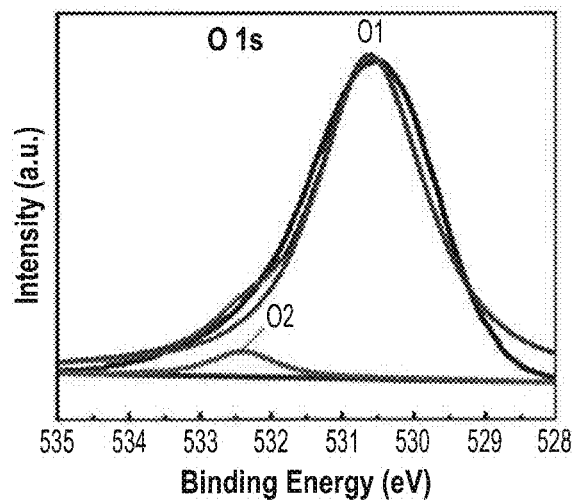

XPS analysis was conducted to examine the surface elemental composition and chemical valence states of the as-prepared composite electrode, and the corresponding plots are shown in FIGS. 4A-4D. As depicted in FIG. 4A, the XPS survey spectrum of NiMoO$_4$—CoMoO$_4$ NSAs electrode shows the presence of Ni, Co, Mo and O elements, and no other impurities being detected. Based on the XPS analysis, the atomic percentages of Ni, Co, Mo and O are 8.99%, 8.96%, 16.48% and 65.57%, respectively. Their atomic molar ratio is therefore about 1:1:2:8, and the Ni/Co atomic ratio is roughly unity. As depicted in FIG. 4B, the high-resolution Ni 2p spectra exhibit fitting peaks at 855.3 and 872.7 eV which are indexed to Ni$^{2+}$ 2p$_{3/2}$ and Ni$^{2+}$ 2p$_{1/2}$, respectively, whereas the peaks at 856.7 and 874.3 eV are assigned to Ni$^{3+}$ 2p$_{3/2}$ and Ni$^{3+}$ 2p$_{1/2}$, respectively. These results confirm the existence of both Ni$^{2+}$ and Ni$^{3+}$ oxidation states in the as-prepared composite material. The Ni 2p spectrum shows the two satellite peaks at 861.6 and 879.5 eV. The deconvoluted Co 2p spectra shown in FIG. 4C exhibits the fitting peaks (denoted as Sat.) at 780.6 eV and 796.6 eV which were assigned to Co$^{3+}$ 2p$_{3/2}$ and Co$^{3+}$ 2p$_{1/2}$, respectively, while the peaks at 782.8 and 798.3 eV were assigned to Co$^{2+}$ 2p$_{3/2}$ and Co$^{2+}$ 2p$_{1/2}$, respectively, indicating the presence of +2 and +3 oxidation states in the prepared composite material. As shown in FIG. 4D, the high-resolution Mo 3d spectra show the two main peaks situated at 232.1 eV and 235.2 cV, which are indexed to Mo 3d$_{5/2}$ and Mo 3d$_{3/2}$, confirming the existence of Mo$^{6+}$ oxidation state. The O 1s XPS spectra in FIG. 4E show the peaks at 530.0 eV (O1) and 532.4 eV (O2), which are characteristic of metal-oxygen bonds and defect oxygen.

Figure 5A:
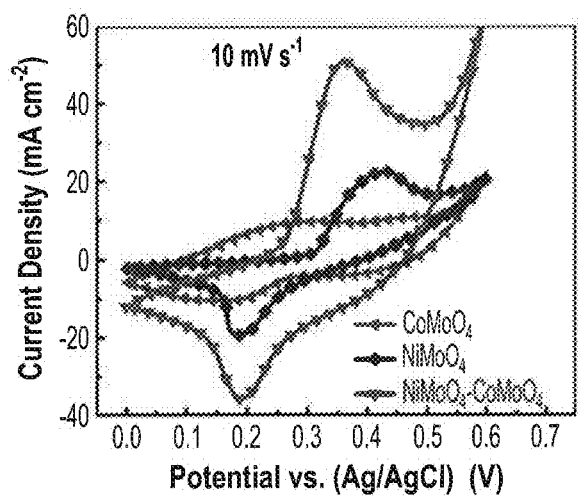
FIGS. 5A-5E depict (A) cyclic voltammetry (CV) curves recorded for as-synthesized samples at a constant scan rate of 10 $mVs^{-1}$; CV profiles of (B) $CoMoO_4$, (C) $NiMoO_4$ and (D) $NiMoO_4$—$CoMoO_4$ NSAs electrodes at operated at different scan rates; and (E) b-value acquired from the log(i) vs. log(v) plot for the cathodic peaks of as-prepared electrodes.

The electrochemical properties of the as-prepared NiMoO$_4$, CoMoO$_4$ and NiMoO$_4$—CoMoO$_4$ NSAs electrodes were investigated in a three-electrode system using 3 M KOH as the aqueous electrolyte. FIG. 5A depicts the comparative CV plots of as-prepared electrodes at a constant scan rate of 10 mV s$^{-1}$ in the potential window of 0 to 0.6 V. From the CV plots, it is evident that all the electrodes delivered well-defined redox peaks with high current response, revealing the battery-type behavior of electroactive materials. However, owing to good reversible transformations of Ni$^{2+}$/Ni$^{3+}$ and Co$^{2+}$/Co$^{3+}$ species, the NiMoO$_4$—CoMoO$_4$ NSAs electrode exhibited larger enclosed CV curve area and higher redox peak current than the bare NiMoO$_4$, CoMoO$_4$ electrodes. This reveals that NiMoO$_4$—CoMoO$_4$ composite has higher charge storage capacity than solely NiMoO$_4$ and CoMoO$_4$ electrodes. The improved performance of the as-prepared NiMoO$_4$—CoMoO$_4$ composite demonstrates a synergic effect of NiMoO$_4$ and CoMoO$_4$ materials, which provides abundant electroactive sites for rapid electrochemical reactions.

Figure 5B:
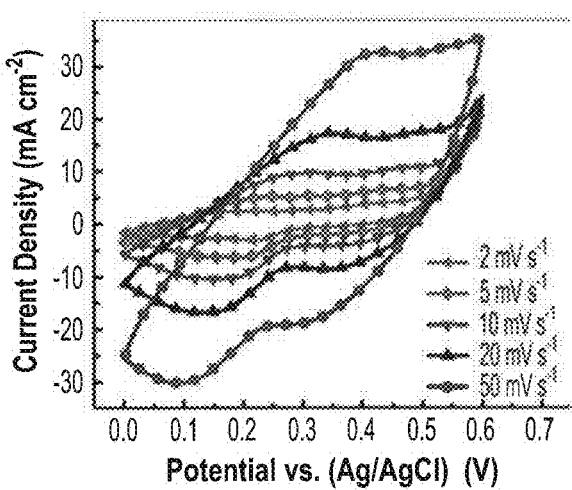
Figure 5C:
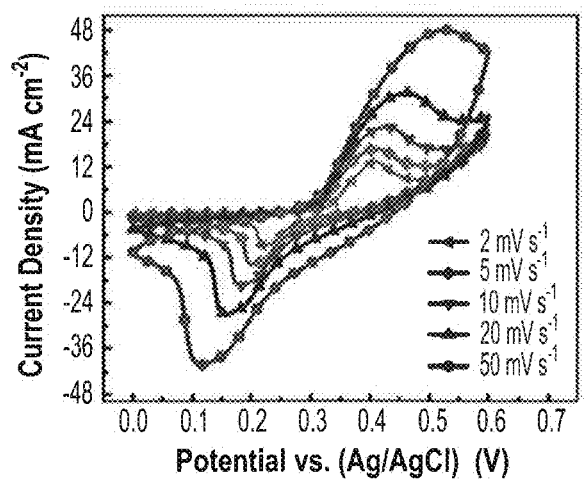
Figure 5D:
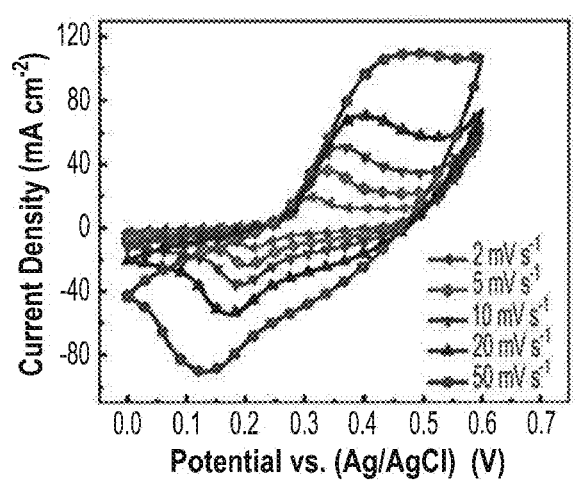
Figure 5E:
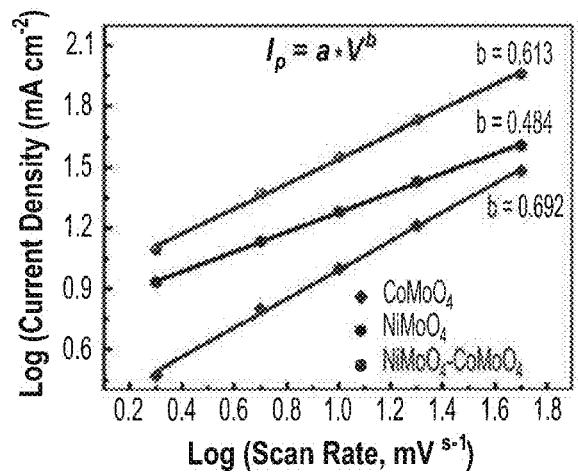

FIGS. 5B-5D show CV plots of the as-prepared NiMoO$_4$, CoMoO$_4$ and NiMoO$_4$—CoMoO$_4$ composite electrodes recorded in a potential window of 0-0.5 V at various scan rates ranging from 5 to 50 MV s$^1$. With increasing scan rate, each prepared sample electrode exhibits a pair of redox peaks with ascending peak current values, revealing good reversibility and rapid reversible electrochemical reactions of the electroactive material. The anodic and cathodic peaks shift to more positive and negative directions, respectively, with increasing scan rate, which is due to good ion diffusion rate and low internal resistance of the electrode material during electrochemical redox reactions. Moreover, to illustrate the electrochemical kinetics of as-prepared electrodes, the relationship between the cathode peak response ($i_p$) and the scan rate (v) was examined using a power law ($i_p=a.v^b$), where a, and b are constants. The b value can be obtained from the slope of log(v)–log($i_p$) plot with values in the range of 0-1. In detail, a b-value near 0.5 indicates a diffusion response (or battery-type behavior), while b-value near 1 denotes a surface-controlled process (or a capacitive process). As depicted in FIG. 5E, the b-values for CuMoO$_4$, NiMoO$_4$ and NiMoO$_4$—CoMoO$_4$ NSAs electrodes are 0.692, 0.484 and 0.613, respectively, which are close to 0.5, revealing a dominant diffusion-controlled behavior. This result is consistent with behavior of battery-type materials.

Figure 6A:
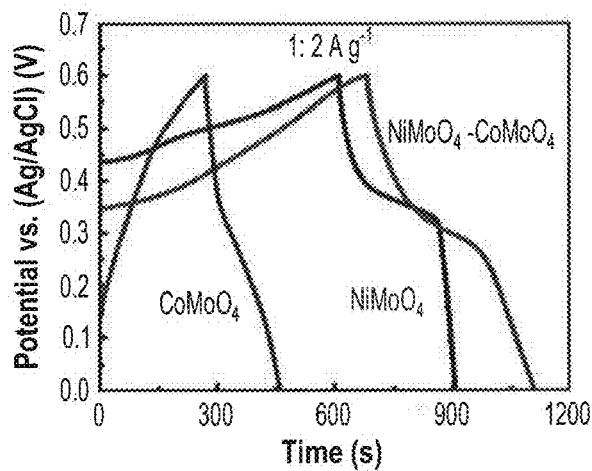
FIGS. 6(A-F) depict (A) comparative galvanostatic charge/discharge (GCD) curves of as-prepared electrodes at 2 A $g^{-1}$; GCD plots of (B) $CoMoO_4$, (C) $NiMoO_4$ and (D) $NiMoO_4$—$CoMoO_4$ composite electrodes at various current densities; (E) calculated specific capacity values with current density for the $NiMoO_4$, $CoMoO_4$ and $NiMoO_4$—$CoMoO_4$ electrodes; and (F) cycling performance of the as-prepared electrodes investigated at 6 A $g^{-1}$ over 5000 cycles.
Figure 6B:
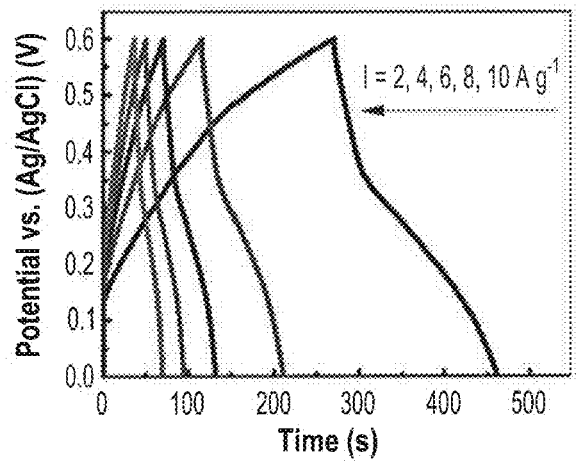
Figure 6C:
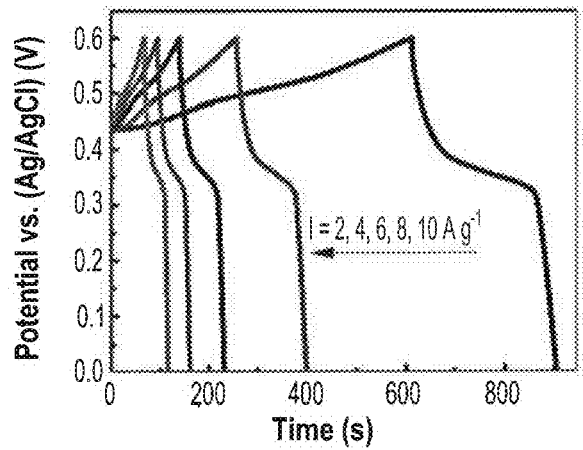
Figure 6D:
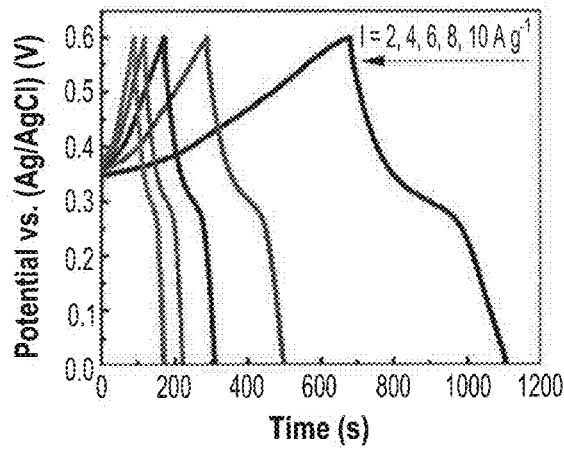
Figure 6E:
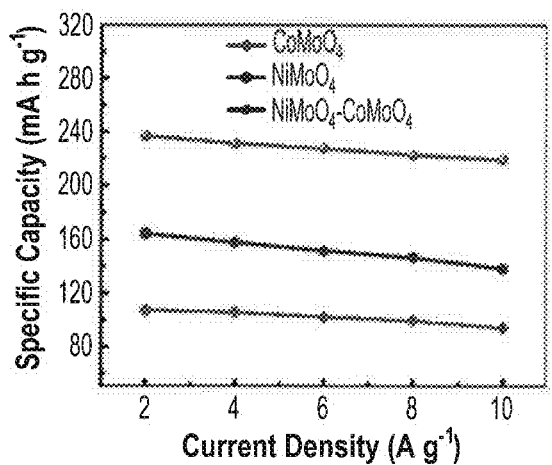

GCD measurement was also conducted to confirm the high capacity performance of NiMoO$_4$—CoMoO$_4$ NSAs in comparison with the other electrodes. FIG. 6A shows the comparative GCD plots of as-prepared electrodes at a constant current density of 2 A g$^{-1}$. It is evident from the GCD plateaus that all the electrodes delivered non-linear charge-discharge profiles of battery-type behavior, which are distinct from the inverted "V" shapes of EDLC materials. Interestingly, the composite of NiMoO$_4$—CoMoO$_4$ NSAs electrode exhibited larger charge-discharge durations than the bare electrodes, which is consistent with the CV results. The larger charge-discharge times of the composite electrode could be ascribed to high mass loading of electroactive material and good electro activity. FIGS. 6B-6D depict the GCD plots of the as-prepared electrodes at various current densities (2 to 10 A g$^{-1}$) using 3 M KOH electrolyte solution. From the GCD plateaus, it is evident that all the electrodes exhibited battery-type redox behavior and symmetric charge-discharge times, demonstrating good reversibility and Faradaic efficiency of the material. Based on Eq. (1) and GCD plots, the calculated specific capacity values as a function of discharge current are plotted in FIG. 6E. It is seen in FIG. 6E that the NiMoO$_4$—CoMoO$_4$ electrode exhibits higher specific capacity values than those of the solely NiMoO$_4$ and CoMoO$_4$ electrodes. At current densities of 2 A g$^{-1}$ and 10 A g$^{-1}$, the NiMoO$_4$—CoMoO$_4$ composite, NiMoO$_4$ and CoMoO$_4$ electrodes delivered gravimetric specific capacity values of about 236.86 F g$^{-1}$ and 218.97 F g$^{-1}$, 164.27 F g$^{-1}$ and 138.16 F g$^{-1}$, and 107.24 F g$^{-1}$ and 93.97 F g$^{-1}$, respectively. The NiMoO$_4$—CoMoO$_4$ composite electrode exhibited a superior rate capability (92.44%) compared with those of solely NiMoO$_4$ (84.1%) and CoMoO$_4$ (87.63%) electrodes.

Figure 6F:
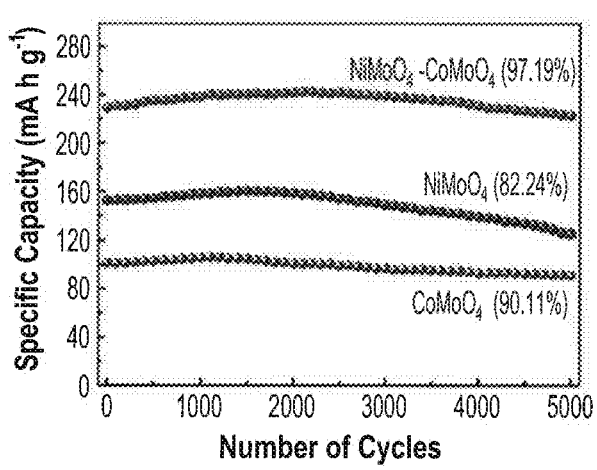

Sufficient cycling stability of the electroactive material is crucial for practical applications. Accordingly, cycling stability of the as-prepared electrodes were evaluated in a three-electrode system by repeating the charge-discharge cycles at a current density of 6 A g$^{-1}$ over 5000 cycles, as shown in FIG. 6F. Over 5000 cycles, NiMoO$_4$—CoMoO$_4$ NSAs electrode delivered an outstanding cycling stability with only 2.81% capacity loss, which is much better than the 9.89% capacity loss for the CoMoO$_4$ electrode and the 17.74% loss for the NiMoO$_4$ electrode, respectively. The superior cycling stability of the composite electrode is due to the synergistic effect between NiMoO$_4$ and CoMoO$_4$ materials and due to the activation of material by continuous penetration of electrolyte within the abundant active sites. Moreover, the specific capacity value and the cycling stability of as-prepared NiMoO$_4$—CoMoO$_4$ NSAs electrode can be comparable with and even higher than those reported in other studies for similar materials as shown in Table 1.

TABLE 1

Electrochemical performance of the as-synthesized NiMoO$_4$—CoMoO$_4$ NSAs electrode relative to existing composite electrodes.

| Electrode materials | Synthesis method | Specific capacity (mA h g$^{-1}$) | Cycling stability (Cycles) | Ref. |
|---|---|---|---|---|
| NiMoO$_4$—CoMoO$_4$ | Hydrothermal | 222.36 mA h g$^{-1}$ at 2 A g$^{-1}$ | 67.1% (2000) | Zhan a. et al. (2015) Phys. Chem. Chem. Phys. 17:20795-20804 |
| CoMoO$_4$—NiMoO$_4$ | Hydrothermal | 114.7 mA h g$^{-1}$ at 1 A g$^{-1}$ | 94% (2000) | Yang et al. (2016) RSC Adv. 6:10520-10526 |
| CoMoO$_4$—NiMoO$_4$ | Hydrothermal | 119.89 mA h g$^{-1}$ at 5 A g$^{-1}$ | 98.4% (1000) | Yin et al. (2015) J. Mater. Chem. A 3:22750-22758 |
| NiMoO$_4$—CoMoO$_4$ | Hydrothermal | 200.69 mA h g$^{-1}$ at 1 A g$^{-1}$ | 78.8% (3000) | Nti et al. (2018) J. Alloys Compd. 742:342-350 |
| NiMoO$_4$—CoMoO$_4$ | Hydrothermal | 89.33 mA h g$^{-1}$ at 0.5 A g$^{-1}$ | — | Yu e al. (2019) J. Alloys Compd. 799:415-424 |
| CoMoO$_4$—NiMoO$_4$·xH$_2$O | Chemical co-precipitation | 115.44 mA h g$^{-1}$ at 0.625 A g$^{-1}$ | 75.1% (1000) | Liu et al. (2013) J. Mater. Chem. A 1:1380-1387 |
| Co$_3$O$_4$@CoMoO$_4$ | Hydrothermal | 173.33 mA h g$^{-1}$ at 1 A g$^{-1}$ | 87.46% (5000) | Gu et al. (2015) J. Mater. Chem, A 3:14578-14584 |
| NiCo$_2$O$_4$@MnMoO$_4$ | Hydrothermal | 186.33 mA h g$^{-1}$ at 1 A g$^{-1}$ | 87.75% (5000) | Gu et al. (2016) J. Mater. Chem. A 4:8249-8254 |
| NiMoO$_4$—CoMoO$_4$ | Chemical bath deposition | 236.86 mA h g$^{-1}$ at 2 A g$^{-1}$ | 97.19% (5000) | Present subject matter |

Figure 7:
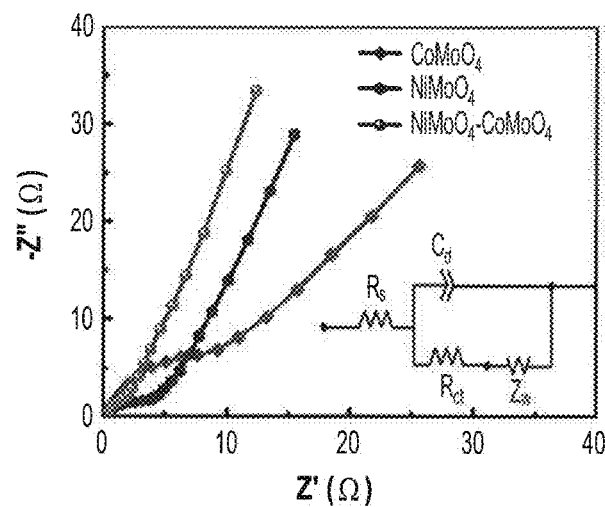
FIG. 7 depicts a comparison of Nyquist plots for the as-prepared electrodes. The inset shows the equivalent circuit to fit the Nyquist plots.

EIS measurement was carried out to investigate the internal resistance of the electrode material as well as the resistance between electrode materials and electrolyte. FIG. 7 shows the EIS plots of the as-prepared NiMoO$_4$, CoMoO$_4$ and NiMoO$_4$—CoMoO$_4$ NSAs electrodes which were recorded from 0.1 Hz to 100 kHz at an open circuit potential. Each of the as-prepared electrodes have similar impedance plots consisting of a quasi-semicircle in high-frequency region, indicating charge-transfer resistance ($R_{ct}$), and linear behavior in the low-frequency region, indicating Warburg impedance ($Z_W$). At the high-frequency region, the intersection of the curve with the real axis corresponds to the equivalent series resistance ($R_S$). The inset of FIG. 7 shows the equivalent circuit used to fit Nyquist plots. The NiMoO$_4$—CoMoO$_4$ composite electrode delivered lower $R_s$ (0.26Ω) and $R_{ct}$ (1.67Ω) values compared with the CoMoO$_4$ ($R_S$=0.28Ω; $R_{ct}$=8.83Ω) and NiMoO$_4$ ($R_S$=0.29Ω; $R_{ct}$=4.29Ω) electrodes. Thus, the NiMoO$_4$—CoMoO$_4$ composite electrode has enhanced electrical conductivity and rapid charge transition over the non-composite electrodes. In the low-frequency region, the slope of the straight line for NiMoO$_4$—CoMoO$_4$ composite electrode is larger than that of the as-prepared NiMoO$_4$ and CoMoO$_4$ electrodes. Thus, the as-prepared NiMoO$_4$—CoMoO$_4$ composite electrode has lower Warburg impedance, indicating enhanced ionic transport. The lower $R_S$, $R_{ct}$ and $Z_W$ values of the composite electrode are mainly due to the synergic effects of NiMoO$_4$ and CoMoO$_4$ materials.

Example 3

HSC Device Based on the Composite Material and G-Ink Electrodes

In order to investigate the practical application of the as-prepared NiMoO$_4$—CoMoO$_4$ NSAs electrode, a hybrid supercapacitor (HSC) device was assembled using NiMoO$_4$—CoMoO$_4$ NSAs as the cathode, the commercially available G-ink as the anode, and a piece of cellulose paper as a separator with 1 M KOH as aqueous electrolyte.

To attain high-performance of HSCs, the masses of the anode and cathode materials in the device are determined by the charge balance and Eq. (3).

$$\frac{m_+}{m_-} = \frac{C_- \times \Delta V_-}{Q_+} \quad (3)$$

where $m_-$, $\Delta V_-$ and $C_-$ are the mass, the potential window and the specific capacitance of the anode, respectively; $m_+$, and $Q_+$ are the mass and the specific capacity and of the cathode, respectively. According to the charge balance, the mass ratio of cathode to anode is found to be ≈0.539 in HSC to achieve high energy density.

The specific capacity ($Q_{SC}$, mA h g$^{-1}$), energy density (E, W h kg$^{-1}$) and power density (P, W kg$^{-1}$) of the HSC were calculated from the galvanostatic discharge curve using the following equation:

$$C_{SC} = \frac{I \times \Delta t}{M \times \Delta V} \quad (4)$$

$$E = \frac{1 \times \int V(t)dt}{M \times 3.6} \quad (5)$$

$$P = \frac{3600 \times E}{\Delta t} \quad (6)$$

where I, Δt and M are the discharge current (A), discharge time (s) and the total mass of the positive and the negative electrode materials (g), respectively.

The fabricated HSC device exhibited a maximum energy density of 27.58 W h kg$^{-1}$ at a power density of 636.05 W kg$^{-1}$ and retained a 20.86 W h kg$^{-1}$ at a maximum power density of 5676.49 W kg$^{-1}$. The achieved energy density values of the as-prepared HSC device are much higher or competitive to those previously reported for HSC or asymmetric supercapacitor devices, including $CoMoO_4@NiMoO_4$/AC (28.7 W h kg$^{-1}$ at 267 W kg$^{-1}$) (Zhang, et al. J. Mater. Chem. A 4 (2016) 18578-18584), NCMOS@CC/AC@CC (33.1 W h kg$^{-1}$ at 199.6 W kg$^{-1}$) (Yu, G. et al. J. Alloys Compd. 799 (2019) 415-424), Ni—Co—S@N-pCNFs/AC@N-pCNFs (21.6 W h kg$^{-1}$ at 134.9 W kg$^{-1}$) (Liu, et al. J. Alloys Compd. 762 (2018) 301-311), $NiCo_2O_4@MnMoO_4$/AC (15 W h kg$^{-1}$ at 336 W kg$^{-1}$) (Yuan, et al., Langmuir 33 (2017) 10446-10454), $NiCo_2S_4$/RGO/AC (24.4 W h kg$^{-1}$ at 750 W kg$^{-1}$) (Li, et al. J. Colloid Interface Sci. 477 (2016) 46-53), $ZnCo_2O_4@Ni_xCo_{2x}(OH)_{6x}$/AC (26.2 W h kg$^{-1}$ at 511.8 W kg$^{-1}$) (Fu et al., J. Mater. Chem. A 4 (2016) 173-182), $CoMoO_4$-3D graphene hybrid/AC (21.1 W h kg$^{-1}$ at 300 W kg$^{-1}$) (Yu et al., Adv. Mater. 26 (2014) 1044-1051) and $CuCo_2O_4$/CuO/AC (18 W h kg$^{-1}$ at 259 W kg$^{-1}$) (Shanmugavani, et al. Electrochim. Acta 188 (2016) 852-862), respectively. Moreover, the HSC exhibited outstanding capacity retention of 95.88% and excellent columbic efficiency of 96.3% over 5000 cycles, denoting its remarkable cycling stability and high reversibility.

Figure 8A:
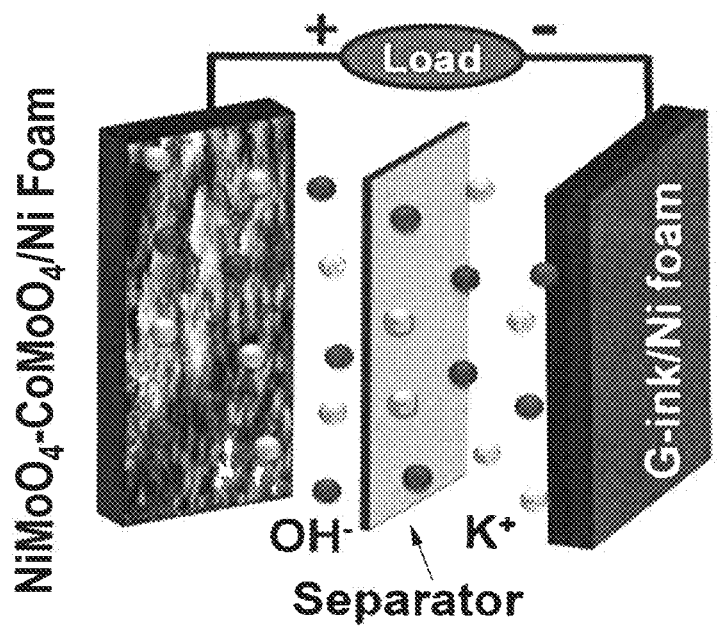
FIGS. 8A-8G depict (A) schematic illustration for the fabrication of $NiMoO_4$—$CoMoO_4$ NSAs/G-ink HSC device; (B) CV plots for the HSC device at various potential regions; (C) CV plots; (D) GCD curves; (E) specific capacitance values and (F) ragone plot of the assembled HSC; and (G) cycling performance of as-prepared HSC over 5000 cycles (inset shows the GCD results of first and last cycles of HSC, and Nyquist plot of HSC before and after cycling test).
Figure 8B:
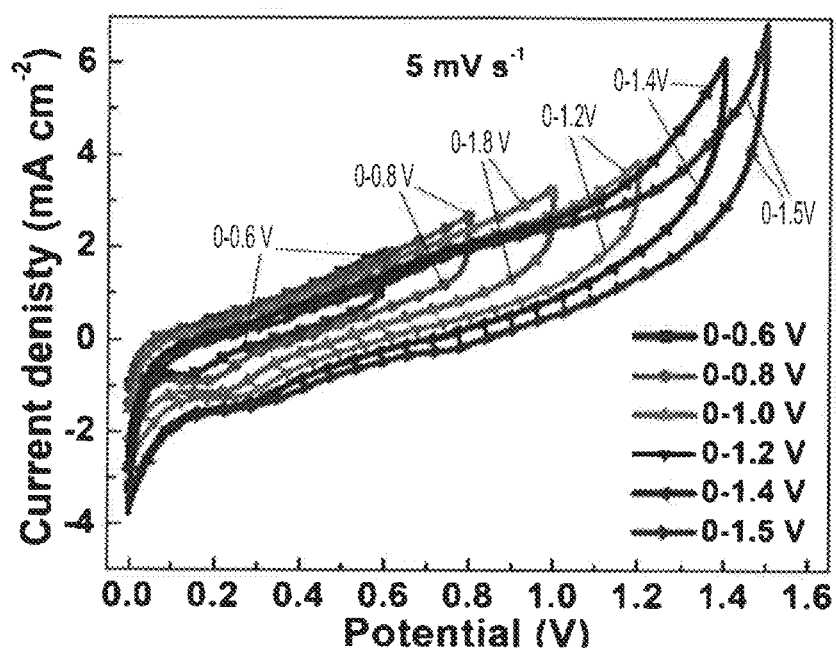

A schematic illustration of the hybrid supercapacitor (HSC) device including the $NiMoO_4$—$CoMoO_4$ NSAs as the cathode, the commercially available G-ink as the anode, and a piece of cellulose paper as a separator with 1 M KOH as aqueous electrolyte is shown in FIG. 8A. The three-electrode system based electrochemical properties of G-ink on Ni foam are depicted in FIGS. 8B-8G. To attain high-performance of HSCs, the masses of the anode and cathode materials in the device were determined by the charge balance and Eq. (3). According to the charge balance, the mass ratio of cathode to anode was found to be ≈0.539 in HSC to achieve high energy density. After assembling the device, a sequence of CV tests were conducted at various potential regions at 2 mV s$^{-1}$ to attain the best operating potential of the HSC, which could be expected to be 1.5 V, as shown in FIG. 8B.

Figure 8C:
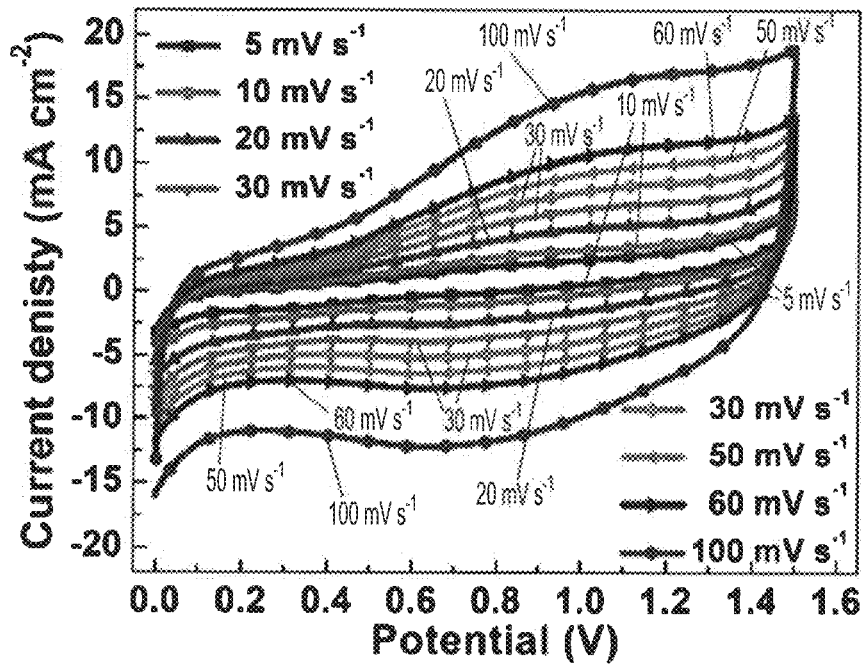
Figure 8D:
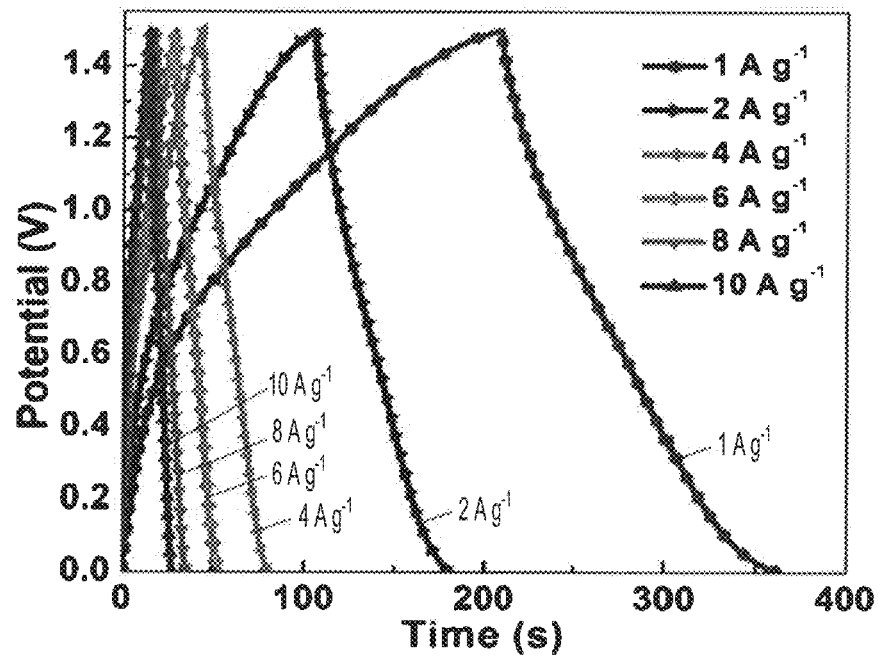
Figure 8E:
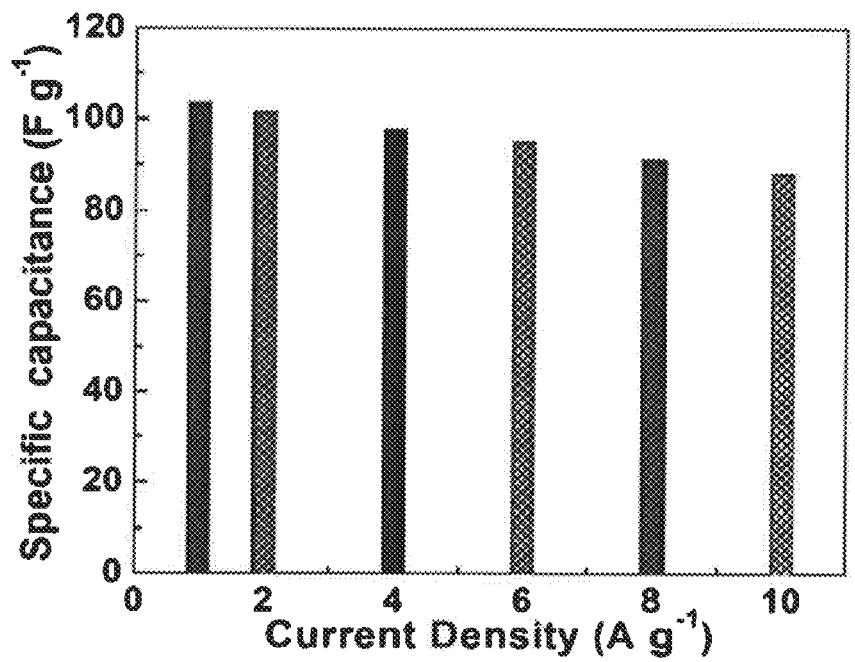
Figure 8F:
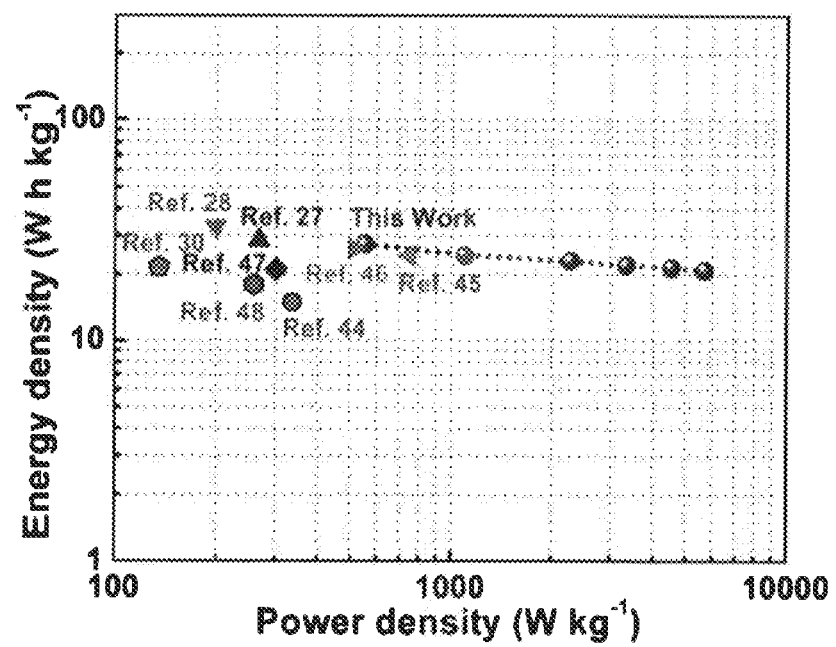

FIG. 8C depicts the CV plots of the optimized $NiMoO_4$—$CoMoO_4$ NSAs/G-ink HSC device collected at different scan rates of 5-100 mV s$^{-1}$ with the potential range of 0-1.5 V. Unlike the apparent redox peaks observed in the three-electrode system, the CV plots of the HSC device delivered quasi-rectangular shapes that are indicative of the typical capacitive behavior due to the inclusion of EDLC material. With increasing scan rate, the shape of the CV plots remained almost the same and the current response distinctively increased, revealing the desirable rate capability for power devices. Furthermore, GCD measurement was conducted to estimate the maximum capacitance, energy and power density values of the HSC. FIG. 8D shows the GCD plots of the HSC at various current densities in the 0-1.5 V potential window. It is evident that all the GCD plots delivered nearly symmetric charge-discharge times, confirming the good rate capability and columbic efficiency of the device. According to GCD results of the HSC and Eq. (4), the specific capacitance reached 104.1 F g$^{-1}$ at the current density of 1 A g$^{-1}$ and 88.2 F g$^{-1}$ at a high current density of 10 A g$^{-1}$, indicating the outstanding rate capability of the HSC (84.72%) (FIG. 8E). Moreover, to illustrate the energy and power densities of the HSC, Ragone plot was obtained based on the GCD plots (FIG. 8F). The fabricated HSC device exhibited a maximum energy density of 27.58 W h kg$^{-1}$ at a power density of 636.05 W kg$^{-1}$, and retained a 20.86 W h kg$^{-1}$ at a maximum power density of 5676.49 W kg$^{-1}$. The achieved energy density values of our HSC device are much higher or competitive to those for previously reported HSC or asymmetric supercapacitor devices.

Figure 8G:
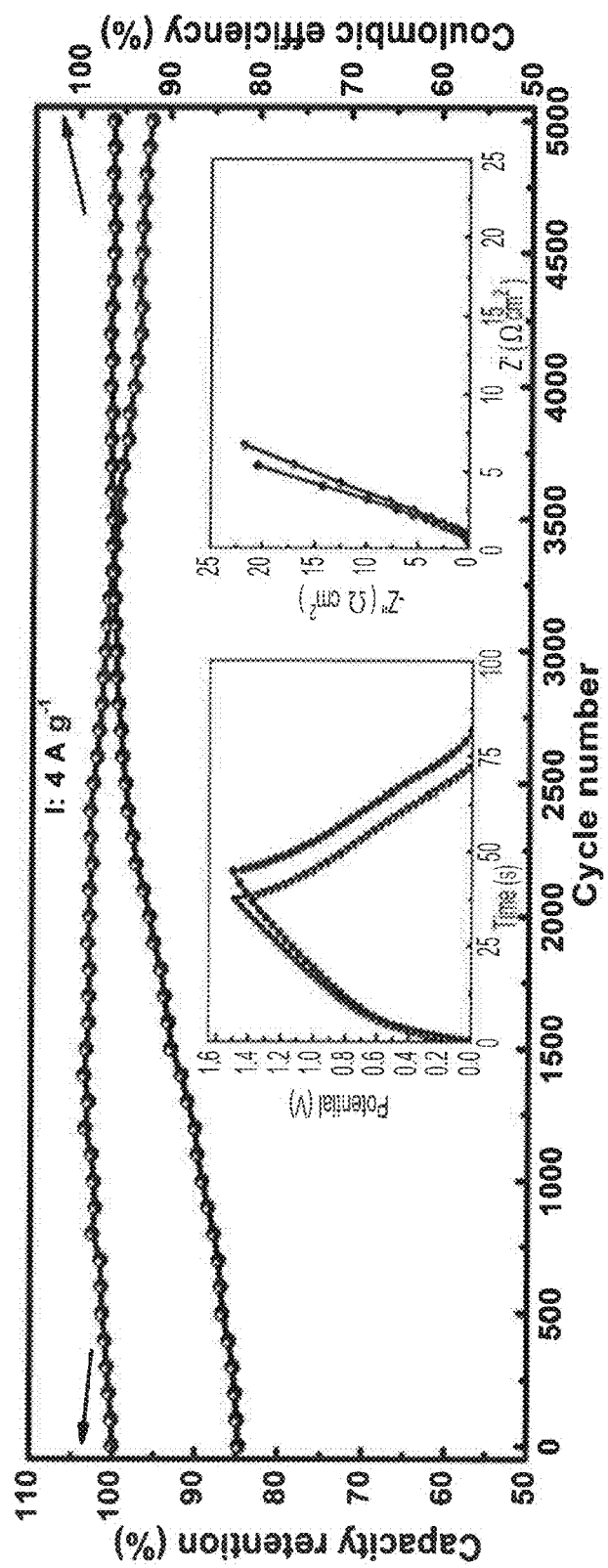

Besides the superior specific capacitance and rate capability properties, the significant cycling stability of HSC is essential for practical applications. FIG. 8G shows the cycling behavior and columbic efficiency of the as-prepared $NiMoO_4$—$CoMoO_4$ NSAs/G-ink HSC device at a current density of 4 A g$^{-1}$ for 5000 cycles. The gradual increment in cycling performance in the initial cycles is ascribed to the activation process of both materials by the deep penetration of electrolyte ions into their interior parts. As a result, the fabricated HSC exhibited outstanding capacity retention of 95.88% and excellent columbic efficiency of 96.3% over 5000 cycles, denoting its remarkable cycling stability and high reversibility. From the GCD first and last cycles, and from the EIS plots (inset of FIG. 8G), it can be clearly observed that the HSC showed only small changes, again revealing its excellent stability. Hence, the achieved attractive outcomes with superb cycling stability of HSC device are ascribed to the hierarchical interconnected flower-like nanosheet arrays and the synergistic effects of the $NiMoO_4$ and $CoMoO_4$ materials combining with G-ink based materials.

It is to be understood that the $NiMoO_4$—$CoMoO_4$ composite material, the HSC comprising said material, and related methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making a NiMoO4-CoMoO4 composite material synthesized via a facile one-step chemical bath deposition method followed by a heat treatment so as to produce flower-like $NiMoO_4$—$CoMoO_4$ nanosheet arrays, the method consisting of the steps of:
   mixing a nickel salt, a cobalt salt and a molybdenum oxide salt with urea and ammonium fluoride to form a mixture, wherein the nickel salt, the cobalt salt and the molybdenum oxide salt are $Ni(NO_3)_2$, $Co(NO_3)_2$, and $Na_2MoO_4$, respectively;
   heating the mixture at a first temperature for a first time in the presence of a nickel foam substrate to form a substrate loaded with the composite material, wherein the first temperature ranges from about 80° C. to about 120° C. and the first time ranges from about 4 hours to about 8 hours;
   rinsing the loaded substrate; and
   annealing the loaded substrate at a second temperature for a second time, wherein the second temperature ranges from about 100° C. to about 300° C. and the second time ranges from about 1 hour to about 3 hours.

2. The method of claim 1, wherein the first temperature is about 100° C. and the second temperature is about 200° C.

3. The method of claim 1, wherein the first time is about 6 hours and second time is about 2 hours.

* * * * *